United States Patent
Nam et al.

(10) Patent No.: US 7,414,455 B2
(45) Date of Patent: Aug. 19, 2008

(54) DIGITAL TEMPERATURE DETECTION CIRCUIT FOR SEMICONDUCTOR DEVICE

(75) Inventors: Jeong Sik Nam, Seoul (KR); Chul Woo Park, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 100 days.

(21) Appl. No.: 11/599,433

(22) Filed: Nov. 15, 2006

(65) Prior Publication Data

US 2007/0110123 A1 May 17, 2007

(30) Foreign Application Priority Data

Nov. 16, 2005 (KR) .................. 10-2005-0109811

(51) Int. Cl.
*H01L 35/00* (2006.01)
(52) U.S. Cl. .................................................. 327/512
(58) Field of Classification Search ............... 327/512, 327/513, 525
See application file for complete search history.

(56) References Cited

U.S. PATENT DOCUMENTS 7,075,847 B2 * 7/2006 Kim et al. .................. 365/222
7,281,846 B2 * 10/2007 McLeod .................. 374/178

FOREIGN PATENT DOCUMENTS

| KR | 1020010103986 | 5/2000 |
| KR | 1020020091657 | 5/2001 |
| KR | 1020040013885 | 8/2002 |

OTHER PUBLICATIONS

Anton Bakker, Johan H. Huijsing, Micropower CMOS Temperature Sensor with Digital Output, IEEE Journal of Solid-State Circuits, Jul. 1996, pp. 933-937, vol. 31, No. 7.

* cited by examiner

*Primary Examiner*—Jeffrey S Zweizig
(74) *Attorney, Agent, or Firm*—Volentine & Whitt, PLLC

(57) ABSTRACT

A digital temperature detection circuit for a semiconductor circuit comprises a digital temperature defection block and a data conversion block. The digital temperature detection block is adapted to detect an internal temperature of the semiconductor device and generate detection data having a data value that varies according to the detected internal temperature. The data conversion block is adapted to convert the detection data into standard data with a predetermined response interval using first and second sample data having respective data values that are determined by input from an external source.

26 Claims, 14 Drawing Sheets

DIGITAL TEMPERATURE DETECTION CIRCUIT FOR SEMICONDUCTOR DEVICE

BACKGROUND OF THE INVENTION

1. Field of the Invention

Embodiments of the present invention relate generally to a temperature detection circuit for a semiconductor device. More particularly, embodiments of the invention relate to a digital temperature detection circuit adapted to output a digitized reading of the internal temperature of the semiconductor device.

A claim of priority is made to Korean Patent Application No. 10-2005-109811, filed Nov. 16, 2005, the disclosure of which is hereby incorporated by reference in its entirety.

2. Description of Related Art

Temperature detection circuits are commonly included in semiconductor devices to detect the devices' internal temperature. Detecting the internal temperature of a semiconductor device can be important for a variety of reasons. For example, the internal temperature can alter the way the device's components work, or even cause the components to fail, and therefore a detected temperature can be used to either adapt the device's behavior to the changed temperature, or to somehow prevent the failure from occurring.

One example of how the internal temperature can affect a device's operating characteristics is provided by a self-refresh operation of a dynamic random access memory (DRAM). The self-refresh operation refreshes the logic state of memory cells in the DRAM to keep any data stored therein from fading. The required frequency of the self-refresh operation is temperature dependent. For example, at higher temperatures, stored information tends to fade more quickly. As a result, the frequency of the self-refresh operation can be increased if the internal temperature of the DRAM is detected to rise. By maintaining the self-refresh frequency at an appropriate level, power consumption in the semiconductor device can be preserved.

In general, a temperature detection circuit for a semiconductor device is included as part of the device. The temperature detection circuit typically detects the internal temperature of the device by comparing the temperature with a predetermined temperature threshold, which is established as part of the device's design. The temperature detection circuit produces a temperature detection signal with a logic state determined by the value of the on comparison results. In a so-called "digital temperature detection circuit", an n-bit temperature detection signal is generated by comparing the internal temperature with $2^n$ threshold temperatures.

Unfortunately, conventional digital temperature detection circuits can be inaccurate for at least a couple of reasons. First, there is often a gap between the theoretical threshold temperature that a device is designed to have and the device's actual threshold temperature. The gap can result from a variety of factors such as different conditions in a manufacturing process. Second, in conventional digital temperature detection circuits, variation in the output data of the detection circuit may not correspond precisely with variation in the internal temperature. For example, a change of 1° C. in the internal temperature may not consistently result in a change of "1" in the output data.

Variation in the output data of a digital temperature detection circuit due to a change of 1° C. in the internal temperature of a semiconductor device is referred to as a "response interval" of the digital temperature detection circuit. In some instances, the response interval of a digital temperature detection circuit may simply be a linear function of the change in temperature. In other cases, however, the response interval may be a non-linear function. In any case, however, where the response interval is not clearly indicative of changes in the internal temperature, it may be difficult for a user to read the output of the temperature detection circuit. For example, a change of 1° C. in the internal temperature of a semiconductor device may result in a change of 0.4 or 1.4 in the output data of the digital temperature detection circuit.

SUMMARY OF THE INVENTION

Recognizing the need for more accurate and user friendly digital temperature detection circuits, embodiments of the present invention provide various digital temperature detection circuits and associated methods of operation.

According to one embodiment of the invention, a digital temperature detection circuit for a semiconductor device comprises a digital temperature detection block, and a data conversion block. The digital temperature detection block is adapted to detect an internal temperature of the semiconductor device and generate detection data having a data value that varies in accordance with the detected internal temperature. The data conversion block is adapted to convert the detection data into standard data with a predetermined response interval using first and second sample data having respective data values that are determined by input from an external source.

According to another embodiment of the invention, a digital temperature detection circuit for a semiconductor circuit comprises a temperature detector, an analog-to-digital converter, and a data converter. The temperature detector generates a temperature detection signal with a voltage level that varies monotonically in relation to an internal temperature of the semiconductor device. The analog-to-digital converter converts the voltage level of the temperature detection signal into detection data having a data value corresponding to the voltage level, and the data converter converts the detection data into standard data having a predetermined response interval using first and second sample data, which have data values that are determined by input from an external source.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

Figure 1:
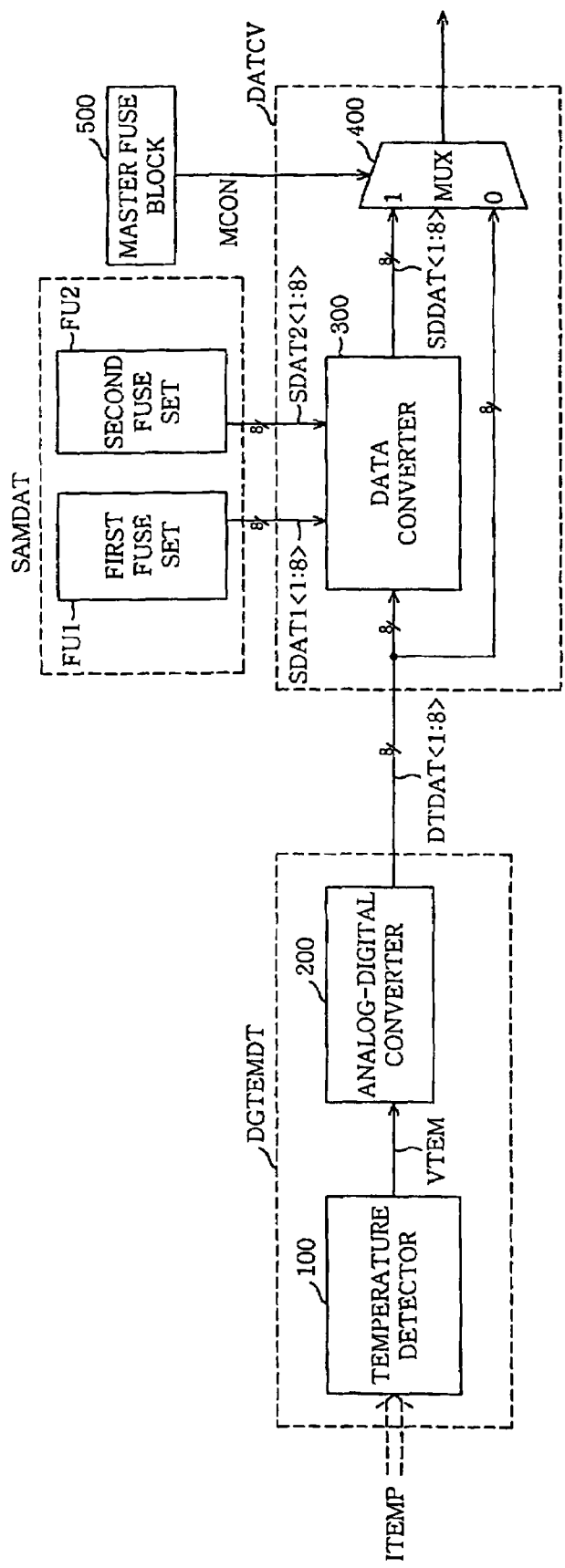
FIG. 1 is a block diagram of a temperature detection circuit for a semiconductor device in accordance with one embodiment of the present invention.

FIG. 1 is a block diagram of a temperature detection circuit for a semiconductor device in accordance with one embodiment of the present invention. Referring to FIG. 1, the digital temperature detection circuit comprises a digital temperature detection block DGTEMDT, a data conversion block DATCV, a sample data generation block SAMDAT, and a master fuse block 500.

Digital temperature detection block DGTEMDT comprises a temperature detector 100 and an analog-to-digital converter 200. Temperature detector 100 detects an internal temperature ITEMP of the semiconductor device and generates a temperature detection signal VTEM. Temperature detection signal VTEM has a voltage level that varies monotonically (e.g., increases or decreases) with increasing values of internal temperature ITEMP.

Analog-to-digital converter 200 converts the voltage level of temperature detection signal VTEM into detection data DTDAT<1:8>. Detection data DTDAT<1:8> comprises an eight bit data value corresponding to the voltage level of temperature detection signal VTEM. Preferably, analog-to-digital converter 200 uses a Successive Approximation Register (SAR) to convert the voltage level of temperature detection signal VTEM into detection data DTDAT<1:8>.

Data conversion block DATCV comprises a data converter 300 and a multiplexer (MUX) 400. Data converter 300 converts detection data DTDAT<1:8> into standard data SDDAT<1:8> using first and second sample data SDAT1<1:8> and SDAT2<1:8>, which are output by sample data generation block SAMDAT. For illustration purposes, it will be assumed that first and second sample data SDAT1<1:8> and SDAT2<1:8> both have constant data values of 10011010 and 01010110, respectively. These data values correspond to the data values of detection data DTDAT<1:8> when internal temperature ITEM equals 85° and −5° respectively. In other words, where internal temperature ITEM equals 85°, detection data DTDAT<1:8> has the same data value as first sample data SDAT1<1:8>, and where internal temperature ITEM equals −5°, detection data DTDAT<1:8> has the same data value as second sample data SDAT1<1:8>.

MUX 400 selectively outputs one of detection data DTDAT<1:8> and standard data SDDAT<1:8> based on a logic state of a MUX control signal MCON output by master fuse block 500. Where the logic state of MUX control signal MCON is logic low (L), MUX 400 outputs detection data DTDAT<1:8>. On the other hand, where the logic state of MUX control signal MCON is logic high (H), MUX 400 outputs standard data SDDAT<1:8>.

In some embodiments of the invention, the logic state of MUX control signal MCON is determined based on whether fuses (not shown) included in master fuse block 500 are cut. In other embodiments, MUX control signal MCON is provided by a Mode Register Set (MRS) (not shown). Where MUX control signal MCON is provided by the MRS, the logic state of the MUX control signal MCON can be externally controlled.

Standard data SDDAT<1:8> varies by 1 when internal temperature ITEMP increases by approximately 1° C. In addition, standard data SDDAT<1:8> provides a substantially accurate indication of the internal temperature of the semiconductor device. As a result, standard data SDDAT<1:8> allows the internal temperature to be easily ascertained by a user of the semiconductor device.

Sample data generation block SAMDAT comprises first and second fuse sets FU1 and FU2, each including fuses (not shown) that can be externally cut. The data values of first and second sample data SDAT1<1:8> and SDAT2<1:8> are determined by which fuses in first and second fuse sets FU1 and FU2 are cut. For example, in the illustration described above, the data values of first and second sample data SDAT1<1:8> and SDAT2<1:8> are set to 10011010 and 01010110, respectively, by cutting specific fuses in first and second fuse sets FU1 and FU2.

As an alternative to providing first and second sample data from first and second fuse sets FU1 and FU2, a Mode Register Set (MRS) can also be used so that the data values of the first and second sample data SDAT1<1:8> and SDAT2<1:8> can be externally controlled.

Figure 2:
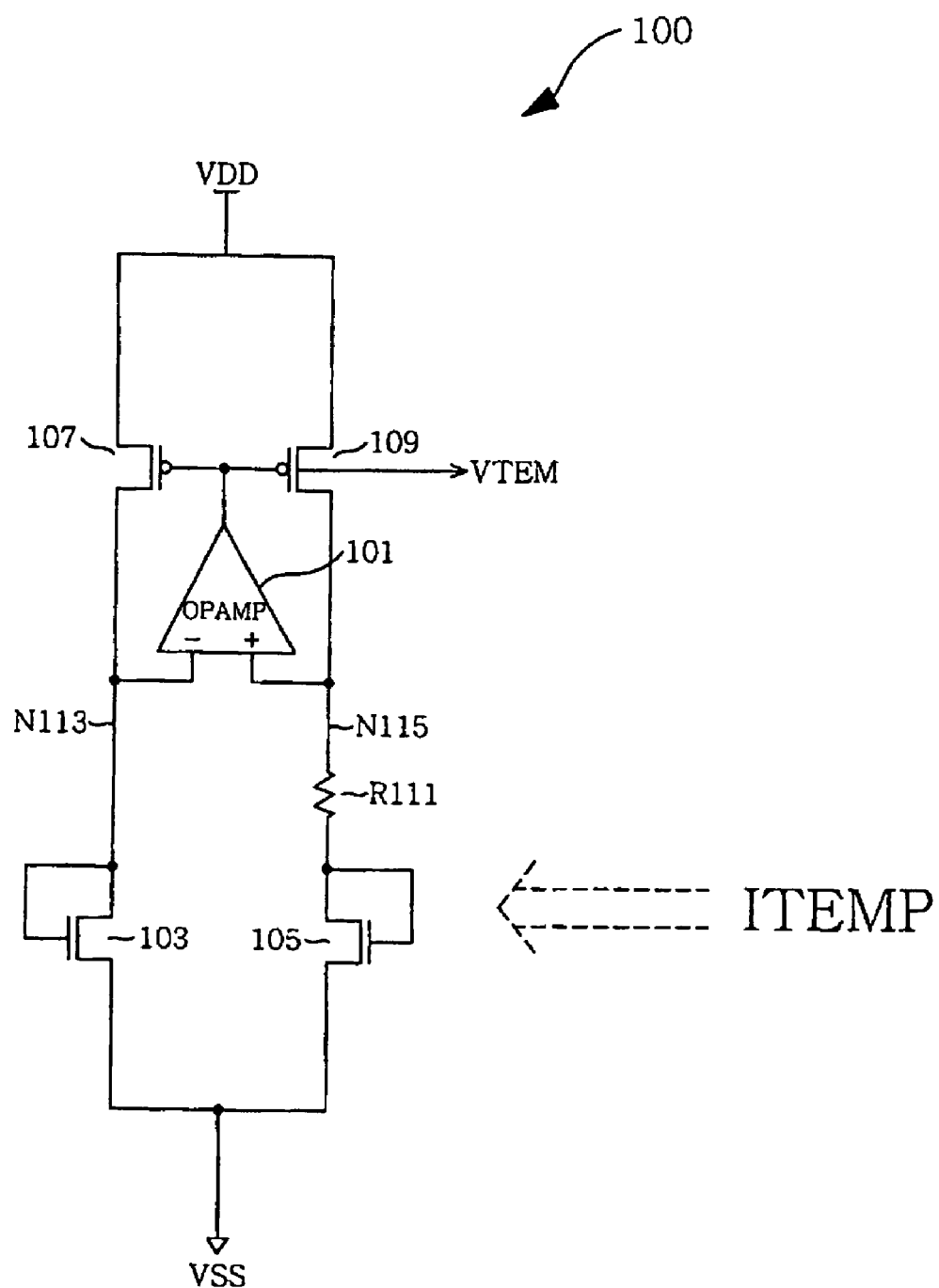
FIG. 2 is a circuit diagram of one embodiment of a temperature detector shown in FIG. 1.

FIG. 2 is a circuit diagram showing one exemplary embodiment of temperature detector 100. Referring to FIG. 2, temperature detector 100 comprises an Operational Amplifier (OP AMP) 101, first and second NMOS transistors 103 and 105, first and second PMOS transistors 107 and 109, and a resistor R111.

OP AMP 101 amplifies a voltage difference between a first input terminal N113 and a second input terminal N115, and outputs the amplified voltage difference as temperature detection signal VTEM. First and second NMOS transistors 103 and 105 form diodes between respective input terminals N113 and N115 and ground VSS. In addition, resistor R111 is arranged between second input terminal N115 and second NMOS transistor 105.

Preferably, the threshold voltage of second NMOS transistor 105 is less sensitive to temperature than the threshold voltage of first NMOS transistor 103. In other words, the threshold voltage of second NMOS transistor 105 will preferably vary less than the threshold voltage of first NMOS transistor 103 when internal temperature ITEMP changes. In general, the temperature sensitivity of the threshold voltage of second NMOS transistor 105 can be adjusted by performing an additional impurity injection process thereon.

The respective gate terminals of first and second PMOS transistors 107 and 109 receive temperature detection signal VTEM output from OP AMP 101, and the respective source terminals of first and second PMOS transistors 107 and 109 are connected to first input terminal N113 and second input terminal N115, respectively. The respective drain terminals of first and second PMOS transistors 107 and 109 are connected to a power supply voltage VDD.

In the embodiment of temperature detector 100 shown in FIG. 2, where internal temperature ITEMP increases, an increased amount of current flows through first and second NMOS transistors 103 and 105. However, the increase in current through second NMOS transistor 105 is less than the increase in current across first NMOS transistor 103 due to the difference in temperature-based threshold voltage variation between these transistors. As a result, the voltage level of temperature detection signal VTEM, i.e., the output signal of OP AMP 101, increases proportional to an increase in internal temperature ITEMP.

Similarly, where internal temperature ITEMP decreases, the amount of current flowing through second NMOS transistor 105 will decrease by an amount less than a corresponding decrease in the current flowing through first NMOS transistor 103. As a result where internal temperature ITEMP decreases, the voltage level of temperature detection signal VTEM decreases accordingly.

Figure 3:
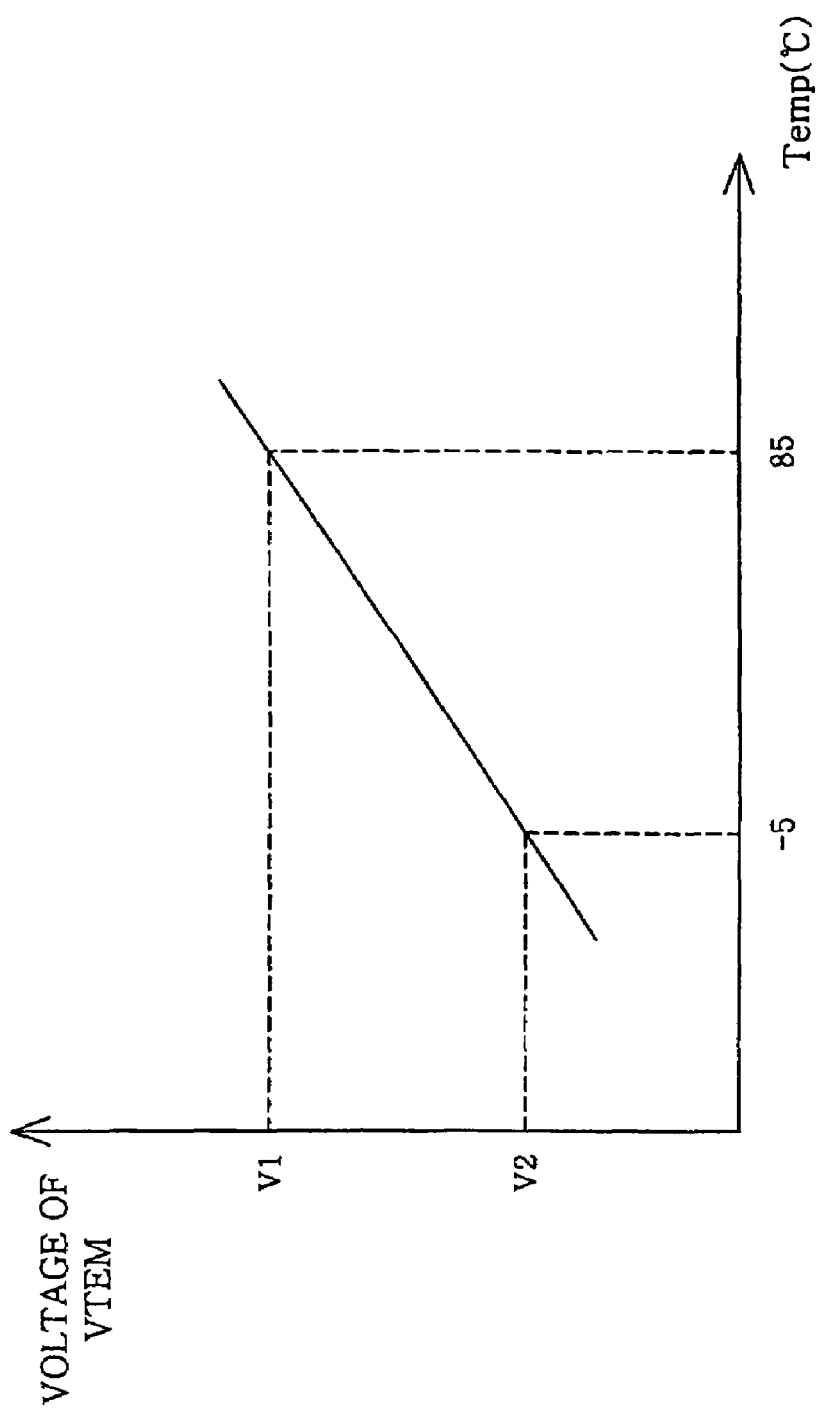
FIG. 3 is a graph showing variation in the voltage level of a temperature detection signal in FIG. 2 as a function of the internal temperature of a semiconductor device.

FIG. 3 contains a graph illustrating an exemplary relationship between internal temperature ITEMP and temperature detection signal VTEM. In FIG. 3, the voltage level of temperature detection signal VTEM varies monotonically based on internal temperature ITEMP. In FIG. 3, temperature detection signal VTEM has respective voltage levels V1 and V2 when internal temperatures ITEMP is 85° C. and −5° C., respectively.

Figure 4:
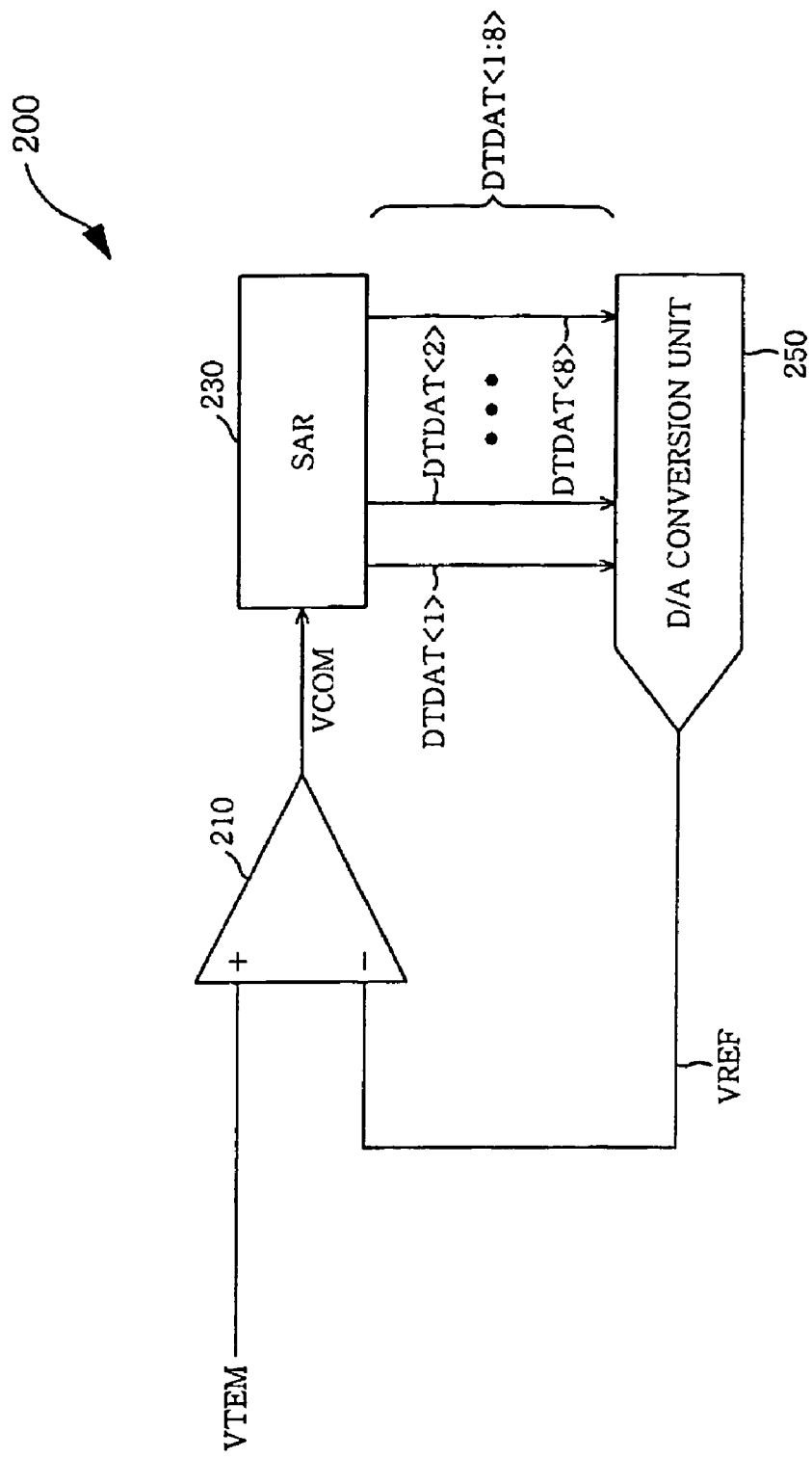
FIG. 4 is a block diagram showing one embodiment of an analog-to-digital converter shown in FIG. 1.

FIG. 4 is a block diagram of an embodiment of analog-to-digital converter 200. Referring to FIG. 4, analog-to-digital converter 200 comprises a comparison unit 210, a Successive-Approximation Register (SAR) 230, and a digital-to-analog conversion unit 250.

Comparison unit 210 has a non-inverting terminal (+), an inverting terminal (−), and an output terminal. The non-inverting terminal receives temperature detection signal VTEM, the inverting terminal receives an analog reference signal VREF, and the output terminal supplies a voltage comparison signal VCOM. Comparison unit 210 compares the respective voltage levels of temperature detection signal VTEM and analog reference signal VREF and generates voltage comparison signal VCOM with a logic state that depends on the result of the comparison. SAR 230 generates and stores detection data DTDAT<1:8> with a data value that depends on the logic state of voltage comparison signal VCOM.

Digital-to-analog conversion unit 250 generates analog reference signal VREF with a voltage level corresponding to the data value of detection data DTDAT<1:8>, and provides analog reference signal VREF to the inverting terminal of comparison unit 210.

The operation of the embodiment of analog-to-digital converter 200 shown in FIG. 4 is described in further detail below. Initially, all 8 bits of detection data DTDAT<1:8> are initialized to "0". Then, a first bit DTDAT<1>, which is the most significant bit (MSB) of detection data DTDAT<1:8>, is set to "1", and analog reference signal VREF is generated with a voltage level corresponding to a value "10000000" of detection data DTDAT<1:8>. Then, comparison unit 210 compares the voltage level of analog reference signal VREF with the voltage level of temperature detection signal VTEM.

Where the voltage level of temperature detection signal VTEM is greater than that of analog reference signal VREF, SAR 230 stores first bit DTDAT<1> as "1". On the other hand, where the voltage level of temperature detection signal VTEM is less than that of analog reference signal VREF, SAR 230 stores first bit DTDAT<1> of detection data DTDAT<1: 8> as "0".

Next, a second bit DTDAT<2> is set to "1" and analog reference signal VREF is generated with a voltage level corresponding to a value "11000000" or "01000000" (depending on whether first bit DTDAT<1> was stored as "0" or "1" in the previous step). The voltage level of analog reference signal VREF is again compared to the voltage level of temperature detection signal VTEM and second bit DTDAT<2> is stored in SAR 230 as "1" if the voltage level of temperature detection signal VTEM is greater than that of analog reference signal VTEM. Otherwise, SAR 230 stores second bit DTDAT<2> as a "0". The process of setting a bit to "1", generating analog reference signal VREF, comparing analog reference signal VREF to temperature detection signal VTEM, and then storing the bit as a "1" or "0" based on the result of the comparison is repeated for third through eighth bits DTDAT<3> through DTDAT<8> so that detection data DTDAT<1:8> has a data value indicative of the voltage level of temperature detection signal VTEM.

As an example of how analog-to-digital converter 200 shown in FIG. 4 operates, suppose that the voltage level of temperature detection signal VTEM corresponds to a data value "11001101" of detection data DTDAT<1:8>. To produce the data value "11001101", the logic state of voltage comparison signal VCOM goes through a series of transitions H, H, L, L, H, H, L and H, and the data value of detection data DTDAT<1:8> changes in the following sequence between first and seventh cycles: "10000000", "11000000", "11000000", "11000000", "11001000", "11001100" and "11001100". Finally, in an eighth cycle, the data value of detection data DTDAT<1:8> becomes "11001101" which is equivalent to the voltage level of temperature detection signal VTEM.

Figure 5:
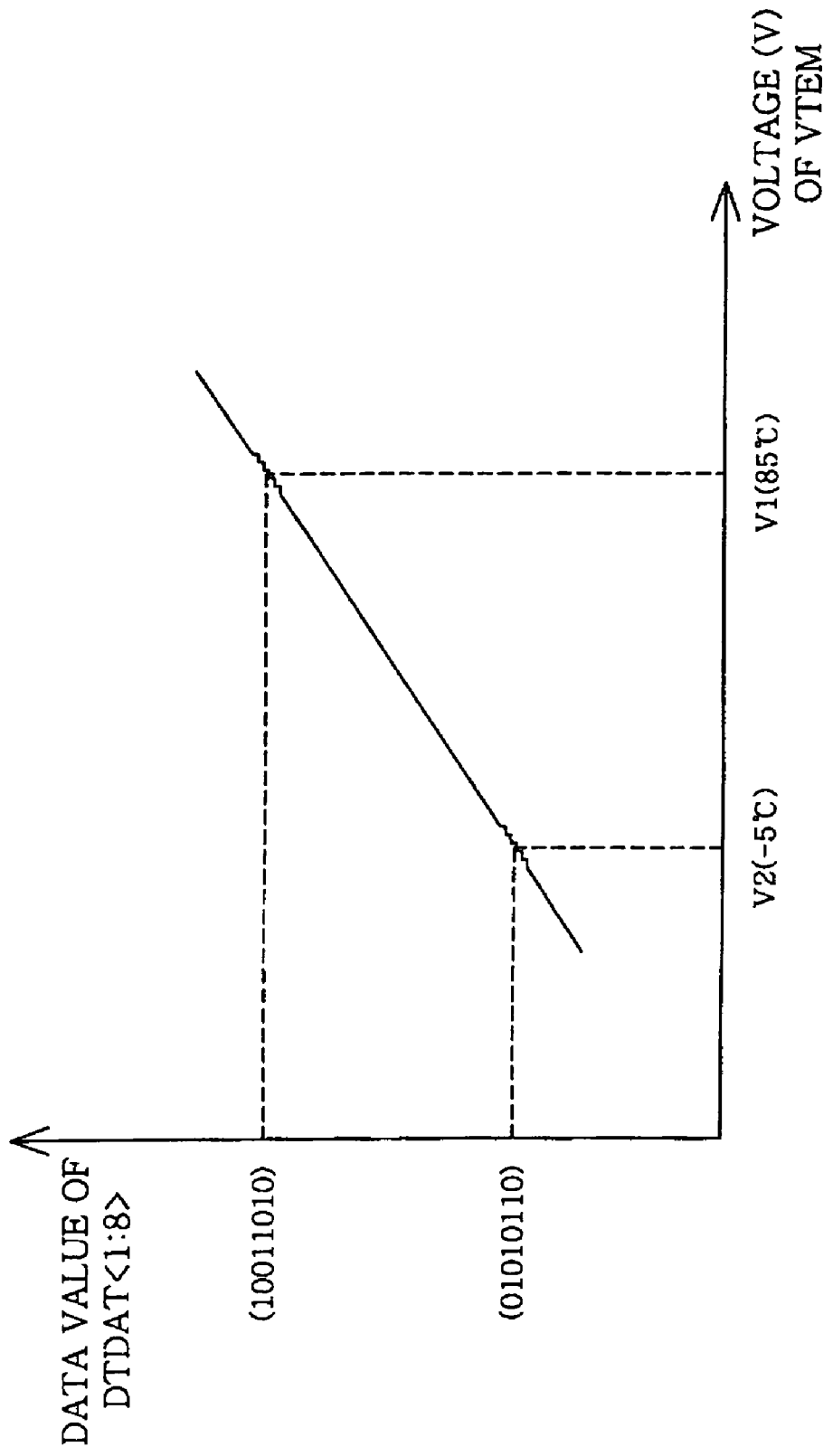
FIG. 5 is a graph showing data values of detection data as a function of the voltage level of the temperature detection signal in FIG. 2.

FIG. 5 contains a graph illustrating how the data value of detection data DTDAT<1:8> varies according to the voltage level of temperature detection signal VTEM. In FIG. 5, where the voltage level of temperature detection signal VTEM is V1, the data value of detection data DTDAT<1:8> is "10011010", and where the voltage level of temperature detection signal VTEM is V2, the data value of detection data DTDAT<1:8> is "01010110". In otherwords, where internal temperature ITEMP is 85° C., the detection data DTDAT<1:8> has the value "10011010", and where internal temperature ITEMP is −5° C., detection data DTDAT<1:8> has the value "01010110".

Figure 6:
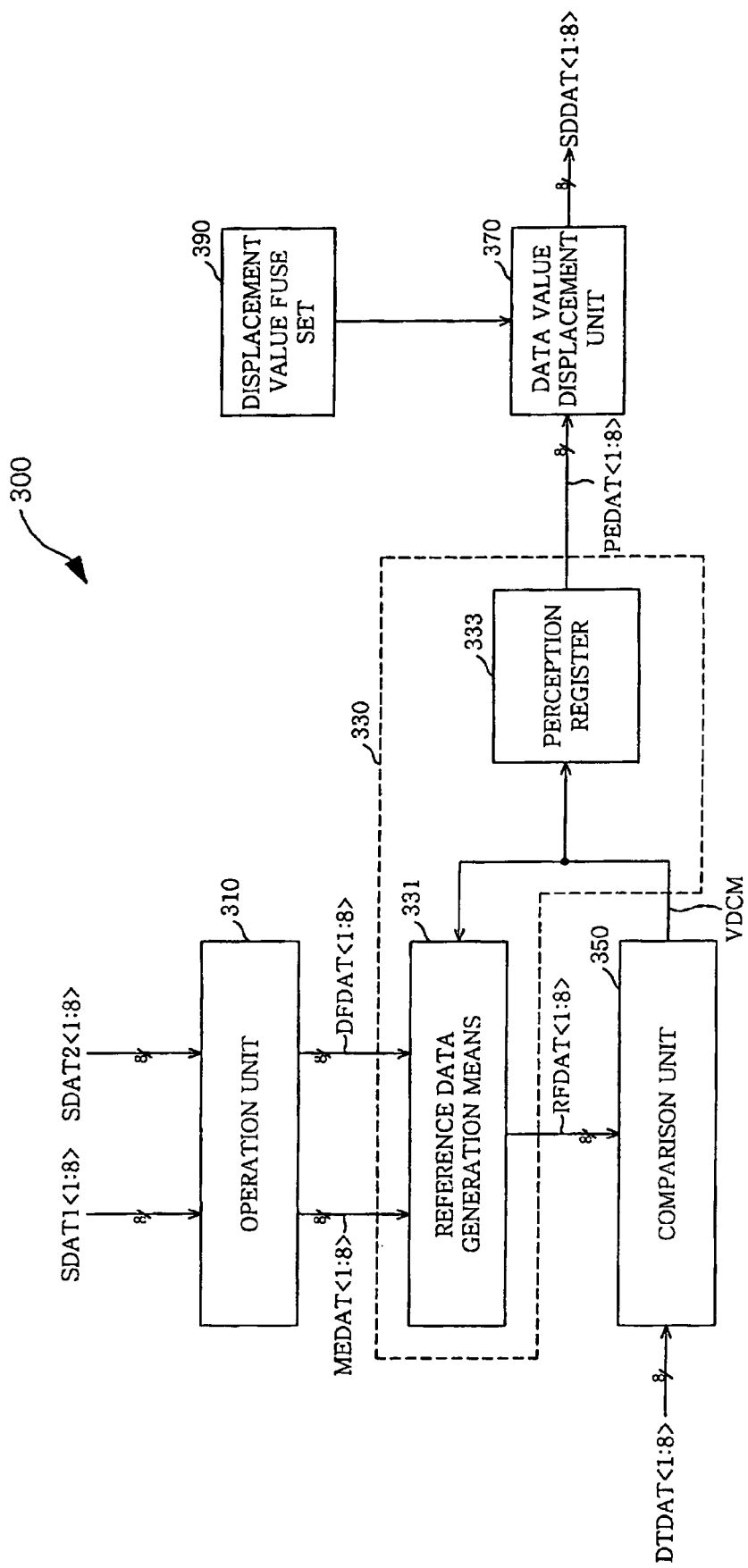
FIG. 6 is a block diagram of an embodiment of a data converter shown in FIG. 1.

FIG. 6 is a block diagram of an embodiment of data converter 300 shown in FIG. 1. Referring to FIG. 6, data converter 300 comprises an operation unit 310, a data generation unit 330 and a comparison unit 350. Data converter 300 further comprises a displacement value fuse set 390, and a data value displacement unit 370. In addition, data generation unit 330 further comprises a reference data generation means 331 and a perception register 333.

Operation unit 310 generates median data MEDAT<1:8> and discrete data DFDAT<1:8> based on first and second sample data SDAT1<1:8> and SDAT2<1:8>. The data value of median data MEDAT<1:8> is determined by a median value of the values of internal temperature ITEMP used to determine the data values of first and second sample data SDAT1<1:8> and SDAT2<1:8>. In particular, median data MEDAT<1:8> is assigned the data value that detection data DTDAT<1:8> has when internal temperature ITEMP is halfway between the temperature values used to determine the data values of first and second sample data SDAT1<1:8> and SDAT2<1:8>. For example, in the above example, first and second sample data SDAT1<1:8> and SDAT2<1:8> are assigned the respective data values detection data DTDAT<1: 8> has when internal temperature ITEMP is 85° and −5°, respectively. Since the number halfway between −5 and 85 is 40 median data MEDAT<1:8> is assigned the data value that detection data DTDAT<1:8> has when internal temperature ITEMP is 40°.

Figure 7:
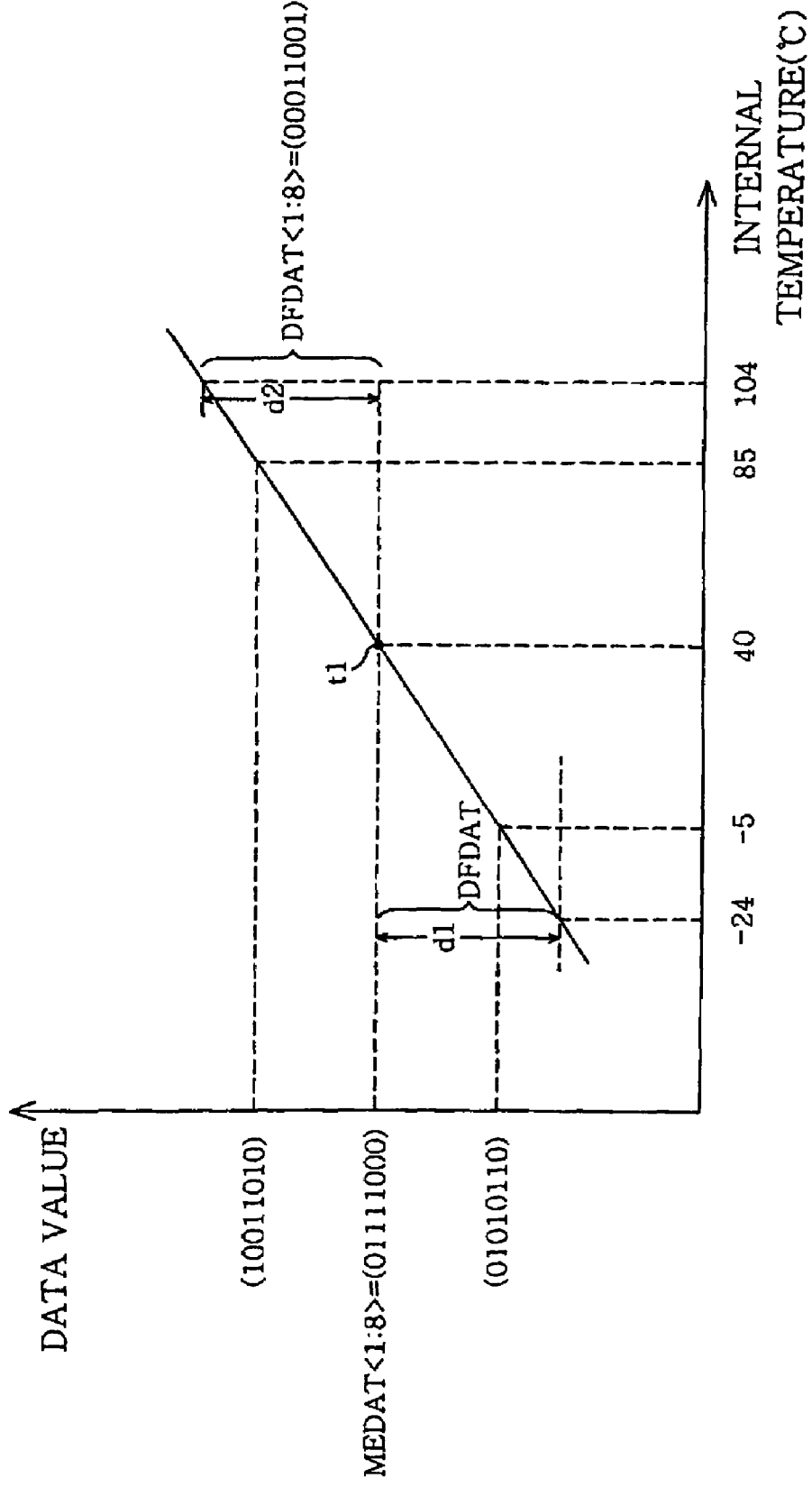
FIG. 7 is a graph of median data and discrete data in FIG. 6 as a function of the internal temperature of the semiconductor device.

Discrete data DFDAT<1:8> has a data value that corresponds to a change in detection data DTDAT<1:8> resulting from changing the value of internal temperature ITEMP by 64°. For example, FIG. 7 shows respective changes d1 and d2 in detection dataIDTDAT<1:8> that result from changing internal temperature ITEMP from −24° to 40° or from changing internal temperature ITEMP from 40° to 104°.

Figure 8:
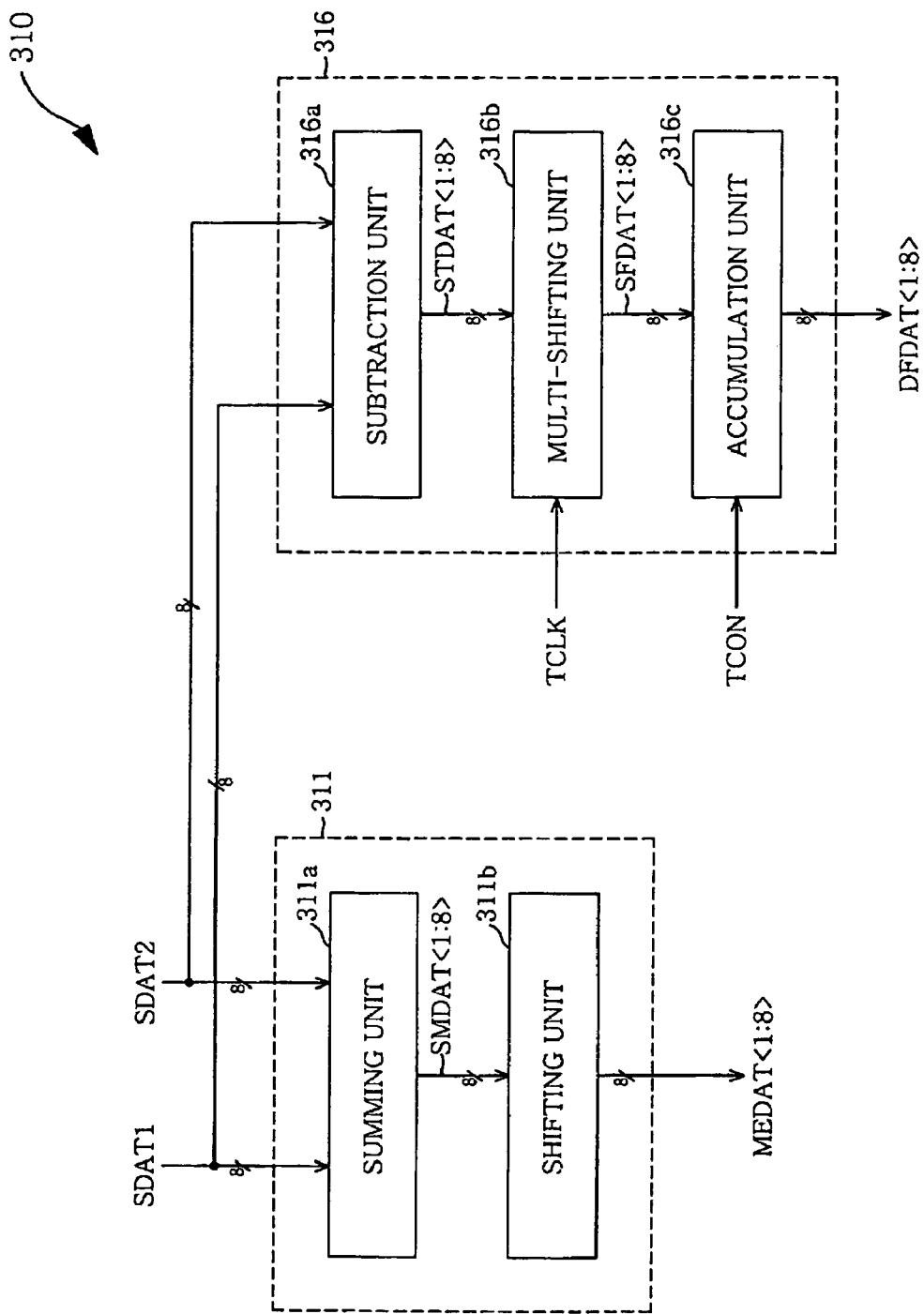
FIG. 8 is a block diagram of one embodiment of an operation unit shown in FIG. 6.

FIG. 8 is a block diagram of one embodiment of operation unit 310 shown in FIG. 6. Referring to FIG. 8, operation unit 310 comprises a median data generation block 311 and a discrete data generation block 316. Median data generation block 311 generates median data MEDAT<1:8> by summing the data values of first sample data SDAT1<1:8> and second sample data SDAT2<1:8> in a summing unit 311a and then shifting sum data SMDAT<1:8>, which results from summing, in a shifting unit 311b.

Figure 9:
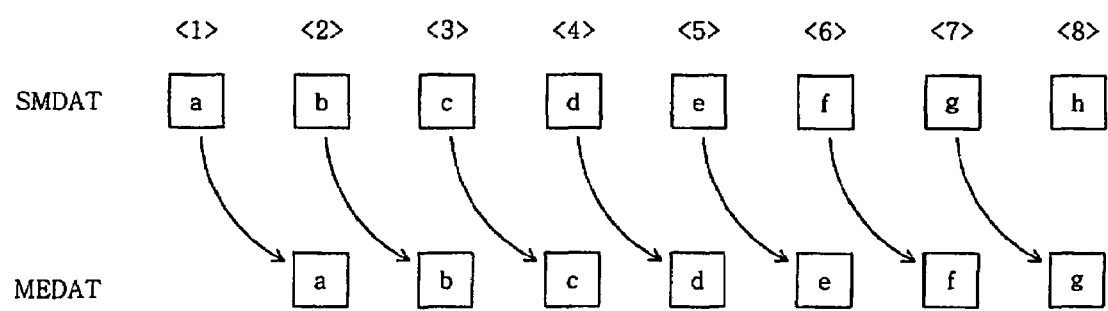
FIG. 9 is a diagram illustrating a method of computing median data.

For example, where first sample data SDAT1<1:8> is "1011010" and second sample data SDAT2<1:8> is "01010110", sum data SMDAT<1:8> has the value "11110000". Shifting unit 311b then shifts the value "11110000" to the right as illustrated in FIG. 9 to produce median data MEDAT<1:8> with the value "01111000". The shift operation performed by shifting unit 311b is approximately the same as dividing sum data SMDAT<1:8> by 2. Where first and second sample data SDAT1 <1:8> and SDAT2<1:8> correspond to the data value of detection data DTDAT<1:8> when internal temperature ITEMP has respective values of 85° and −5°, median data MEDAT<1:8> provides an approximation of the data value of detection data DTDAT<1:8> when internal temperature ITEMP is 40° C.

Discrete data generation block 316 comprises a subtraction unit 316a, a multi-shifting unit 316b and an accumulation unit 316c. Discrete data generation block 316 generates discrete data DFDAT<1:8> by first computing subtraction data STDAT<1:8> as a difference between the data values of first sample data SDAT1 <1:8> and second sample data SDAT2<1:8>. For example, where first sample data SDAT1<1:8> is "10011010" and second sample data SDAT2<1:8> is "01010110", the data value of subtraction data STDAT<1:8> is "01000100" (68 in base 10). The data value of subtraction data STDAT<1:8> represents the range of a data value variation that corresponds to a variation of internal temperature ITEMP. For example, where internal temperature ITEMP ranges from −5° C. to 85° C., subtraction data STDAT<1:8> corresponds to an internal temperature range of 90° C.

Figure 10A:
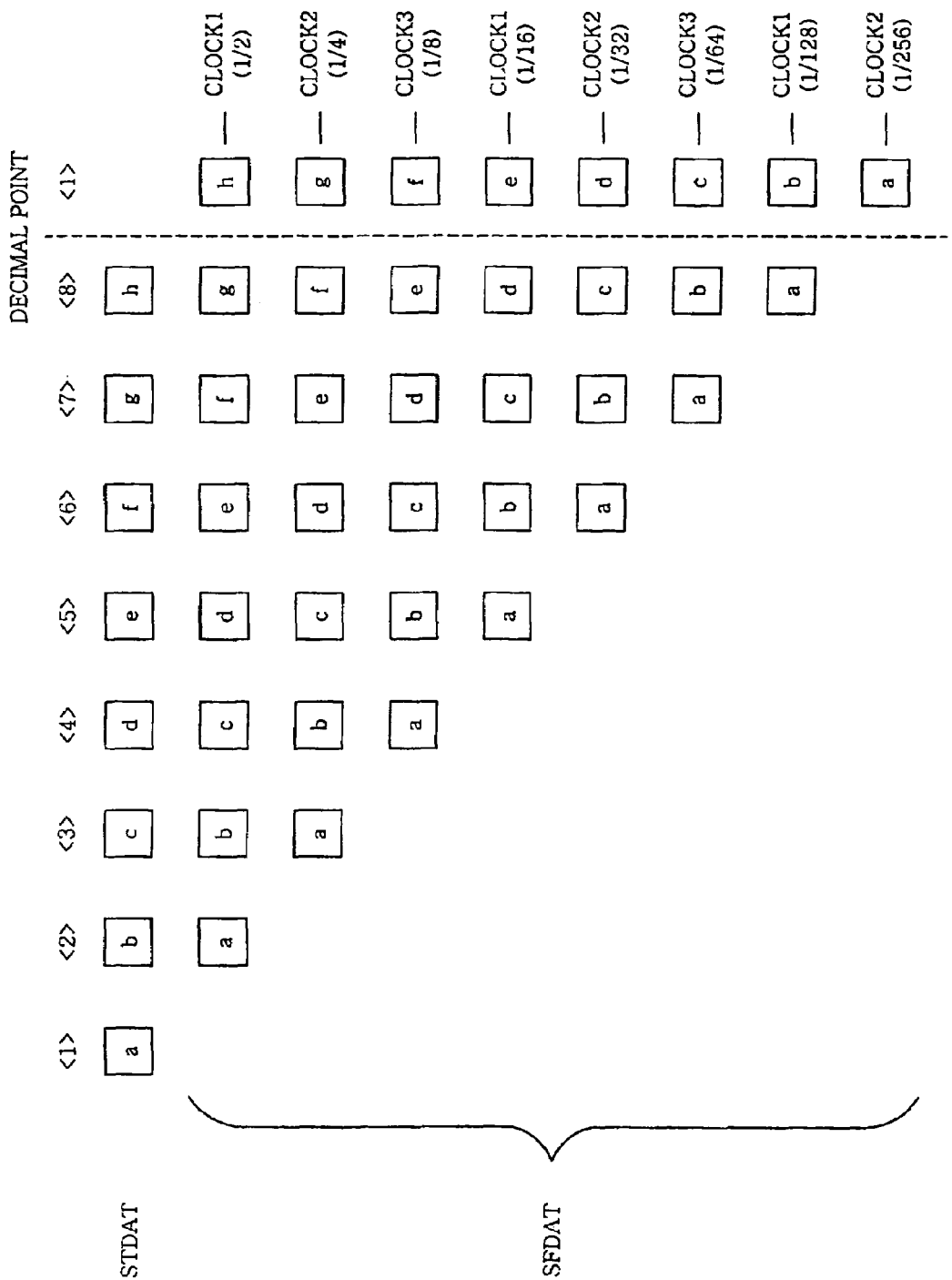
FIGS. 10A and 10B are diagrams illustrating a method of computing discrete data.

As illustrated in FIGS. 9 and 10A, multi-shifting unit 316b sequentially shifts subtraction data STDAT<1:8> to the right in response to a control clock signal TCLK to generate discrete shift data SFDAT<1:8>. A first bit SFDAT<1> of discrete shift data SFDAT<1:8> can be used as a value in a first decimal place of discrete shift data SFDAT<1:8>. In FIG. 10A, the data value of the discrete shift data SFDAT<1:8> at a first clock corresponds to ½ of the data value of the subtraction data STDAT<1:8>. Further, the data values of the discrete shift data SFDAT<1:8> at subsequent second through eighth clocks correspond to ¼, ⅛, 1/16, 1/32, 1/64, 1/128 and 1/256 of the data value of the subtraction data STDAT<1:8>, respectively.

Referring again to FIG. 6, accumulation unit 316c selectively accumulates the data values of discrete shift data SFDAT<1:8> in response to an accumulation control signal TCON, and the data value of discrete data DFDAT<1:8> is computed through the accumulation of data values by accumulation unit 316c. The data values of discrete shift data SFDAT<1:8> are selectively accumulated in response to accumulation control signal TCON according to the range of data values of detection data DTDAT<1:8>.

Using the example illustrated in FIG. 7, discrete data DFDAT<1:8> corresponds to a change in detection data DTDAT<1:8> when internal temperature ITEMP is varied by 64°. An exemplary method of computing discrete data DFDAT<1:8> is described by the following example.

First, the ratio of 64 to 45 can be expressed by the following equation (1).

$$64/45 = (64/8192)*(8192/45) \quad (1)$$
$$= (1/128)*(182.04)$$
$$= (1/128)*(128 + 32 + 16 + 4 + 2 + 0.04)$$
$$= 1 + 1/4 + 1/8 + 1/32 + 1/64 + 0.04/128$$

The last term on the right side of Equation (1), namely, 0.04/128, can be treated as an error and ignored. Accordingly, using the method illustrated by equation (1), discrete data DFDAT<1:8> can be obtained by the following equation (2).

$$DFDAT<1:8> = (SDAT1<1:8> - \quad (2)$$
$$SDAT2<1:8> *(1/2)*(64/45)$$
$$= STDAT<1:8> *$$
$$(1/2 + 1/8 + 1/16 + 1/64 + 1/128)$$

Figure 10B:
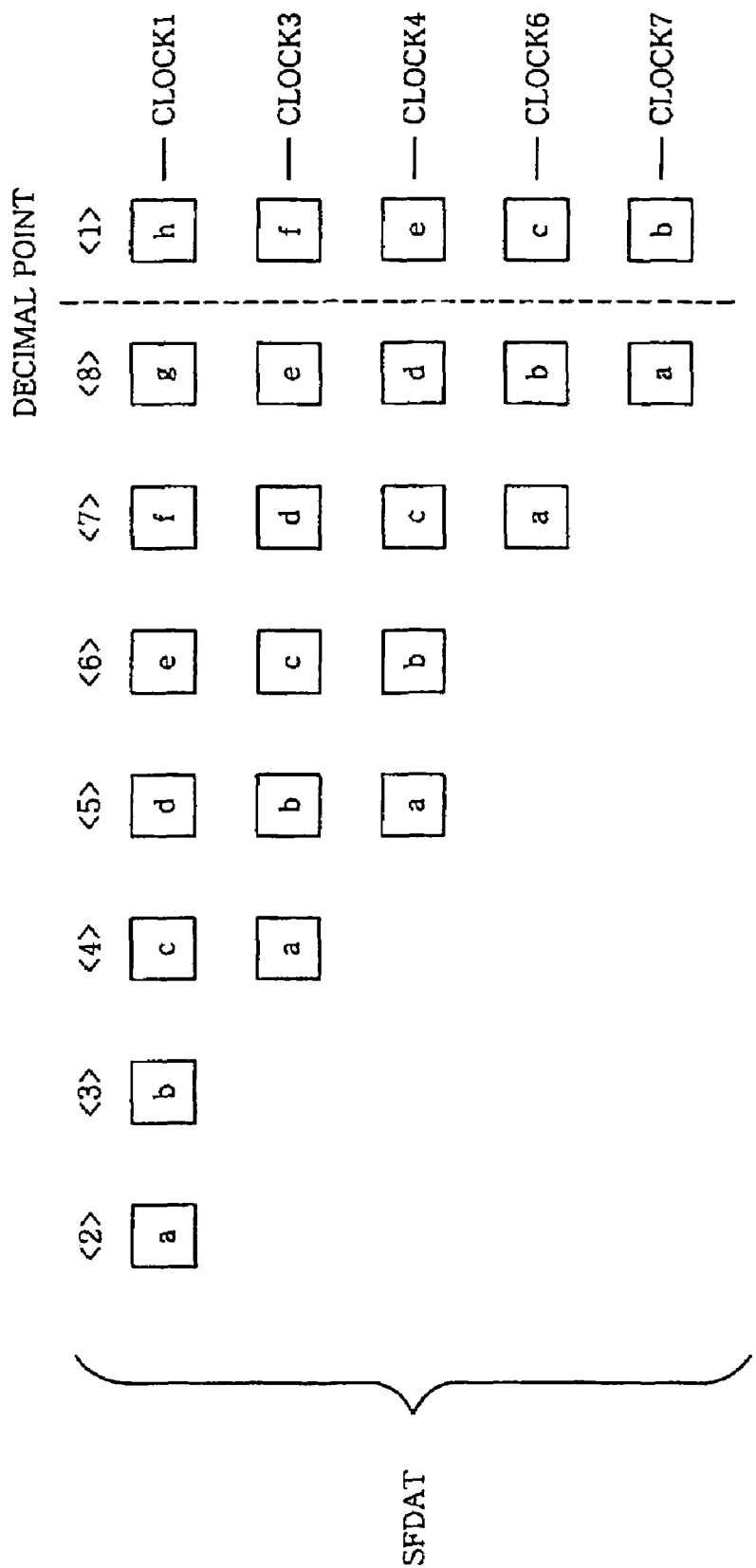

Accordingly, in order to generate discrete data DFDAT<1:8>, discrete shift data SFDAT<1:8> is selectively accumulated at the first, third, fourth, sixth and seventh clocks as shown in FIG. 10B. Through the above method, the data values of discrete shift data SFDAT<1:8> are selectively accumulated to generate discrete data DFDAT<1:8>.

In the example described above, the data value of discrete data DFDAT<1:8> is "00011001" (29 in base 10).

Referring again to FIG. 6, data generation unit 330 generates reference data RFDAT<1:8> and perception data PEDAT<1:8>, using median data MEDAT<1:8> and discrete data DFDAT<1:8>.

Reference data RFDAT<1:8> has data values that are interpolated using median data MEDAT<1:8> and discrete data DFDAT<1:8>. In addition, perception data PEDAT<1:8> has data values with the same response interval as the data values of standard data SDDAT<1:8>. The data values of reference data RFDAT<1:8> and perception data PEDAT<1:8> are respectively output by reference data generation means 331 and perception register 333 in response to a data comparison signal VDCM.

Comparison unit 350 compares reference data RFDAT<1:8> with detection data DTDAT<1:8> to generate data comparison signal VDCM. Data comparison signal VDCM has a logic state that indicates the result of the comparison between reference data RFDAT<1:8> and detection data DTDAT<1:8>. In addition, digital comparison signal VDCM is fed back to data generation unit 331.

Figure 11:
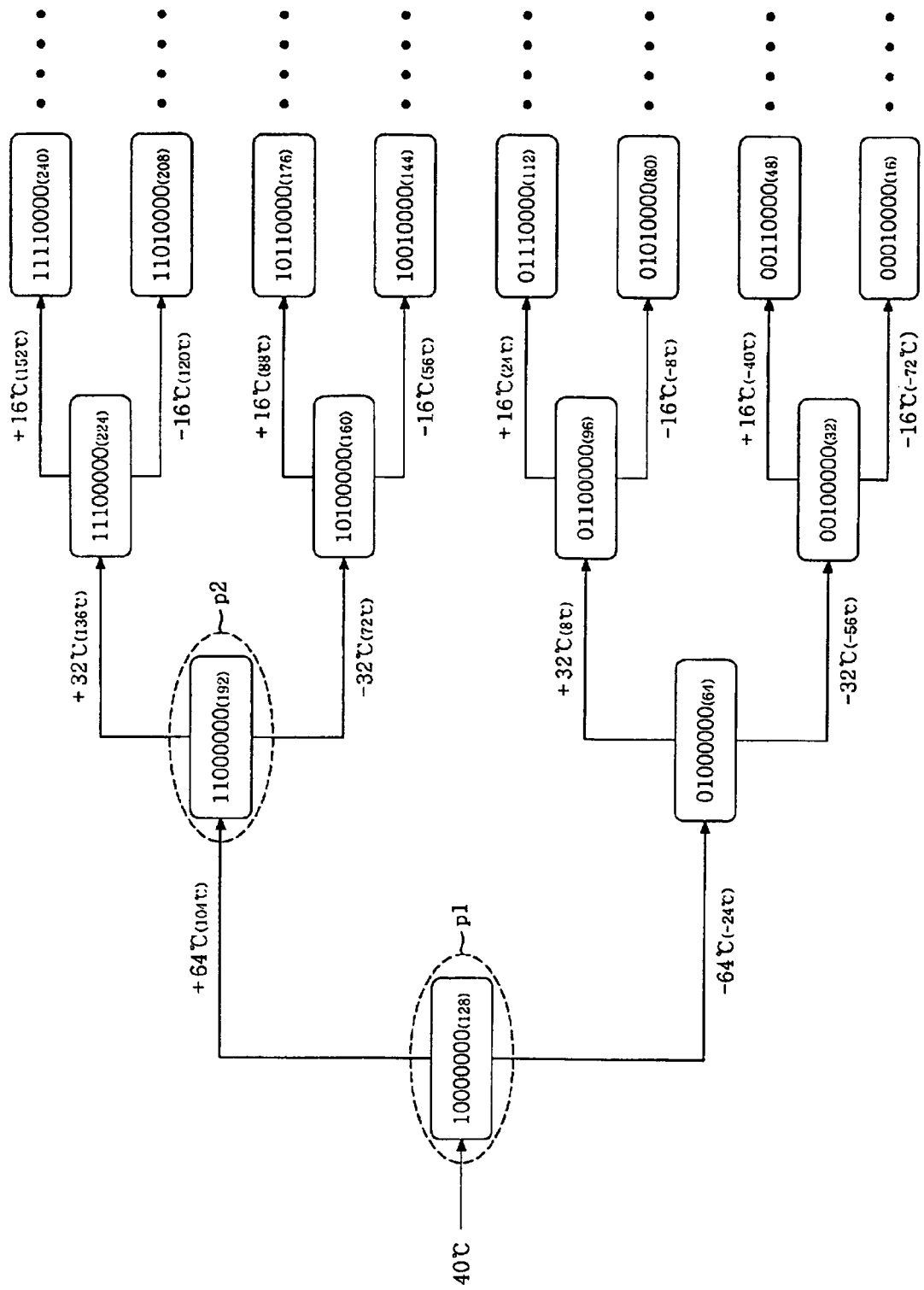
FIG. 11 is a tree-type diagram showing variation in data values of perception data according to changes in internal temperature.

FIG. 11 illustrates a method of varying the data values of perception data PEDAT<1:8> based on internal temperature ITEMP. In FIG. 11, eight-bit data values of perception data PEDAT<1:8> with their corresponding decimal (i.e., base-10) values are shown in boxes. Also in FIG. 11, temperatures corresponding to the data values in the boxes are shown along arrows outside of the boxes. In particular, temperature changes between adjacent boxes are shown along arrows between the adjacent boxes, and the temperature corresponding to the data value in each box is shown in parentheses, with the exception that the temperature corresponding to a box labeled "p1" is not in parentheses.

For instance, where internal temperature ITEMP is 40° C., the data value of perception data PEDAT<1:8> is 10000000 as in p1. If internal temperature ITEMP increases from p1 by 64° C. as in p2, the data value of the perception data PEDAT<1:8> becomes 11000000. If internal temperature ITEMP decreases from p2 by 32° C., the data value of the perception data PEDAT<1:8> becomes 10100000.

As shown in FIG. 11, where internal temperature ITEMP is 40° C., the data value of perception data PEDAT<1:8> is a decimal number 128. As internal temperature ITEMP increases or decreases by 1° C., the data value of the perception data PEDAT<1:8> increases or decreases by a decimal number of 1.

Data value displacement unit 370 shown in FIG. 6 displaces the data value of perception data PEDAT<1:8> by a predetermined displacement value to generate the data value of standard data SDDAT<1:8>.

Figure 12:
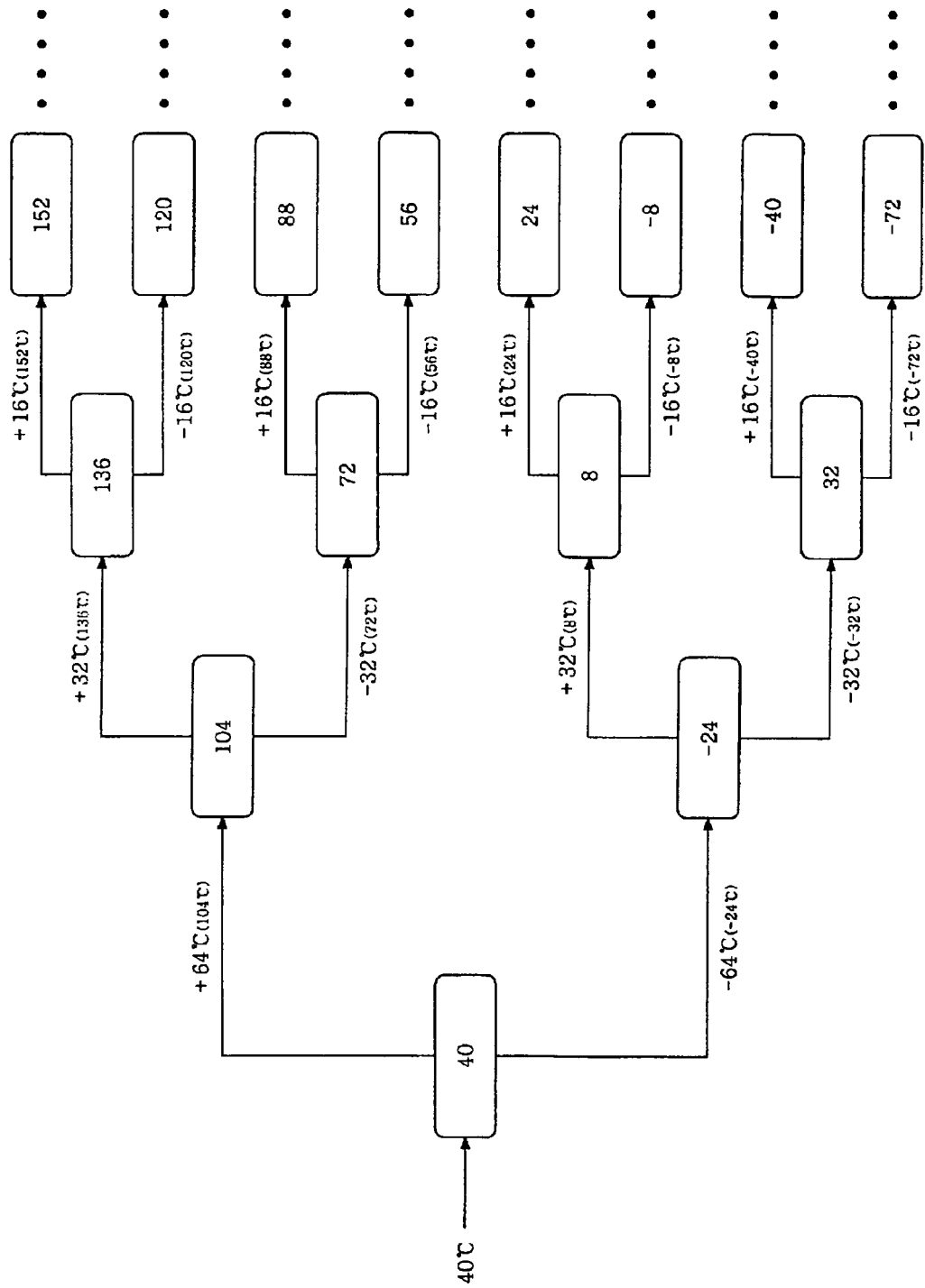
FIG. 12 is a tree-type diagram showing variation in data values of perception data according to changes in internal temperature; and, FIG. 13 is a flowchart illustrating a method of detecting the internal temperature of a semiconductor device using a digital temperature detection circuit according to an embodiment the present invention.

In an example shown in FIG. 12, the displacement value is −88. Accordingly, decimal values shown in boxes in FIG. 12 are derived by offsetting decimal values in corresponding boxes in FIG. 11 by −88. Furthermore, the decimal values shown in the boxes in FIG. 12 correspond to the value of internal temperature ITEMP. In other words, different values of standard data SDDAT<1:8> are represented in decimal format by the decimal numbers shown in boxes FIG. 12, and the values of standard data SDDAT<1:8> correspond to different values of internal temperature ITEMP. In other words, if internal temperature ITEMP is 40° C., the data value of standard data SDDAT<1:8> is 40. More generally, if internal temperature ITEMP is x° C., the data value of the standard data SDDAT<1:8> is x. Because standard data SDDAT<1:8> is in decimal format, a user can easily ascertain internal temperature ITEMP by reading the data value of standard data SDDAT<1:8>.

Displacement value fuse set 390 shown in FIG. 6 can be used to control the displacement value of data value displacement unit 370. The displacement value can be controlled by cutting fuses (not shown) in the displacement value fuse set 390. Alternatively, the displacement value of data value displacement unit 370 could be controlled by a Mode Register Set (MRS) (not shown). By using the MRS, the displacement value of data value displacement unit 370 can be externally controlled.

Figure 13:
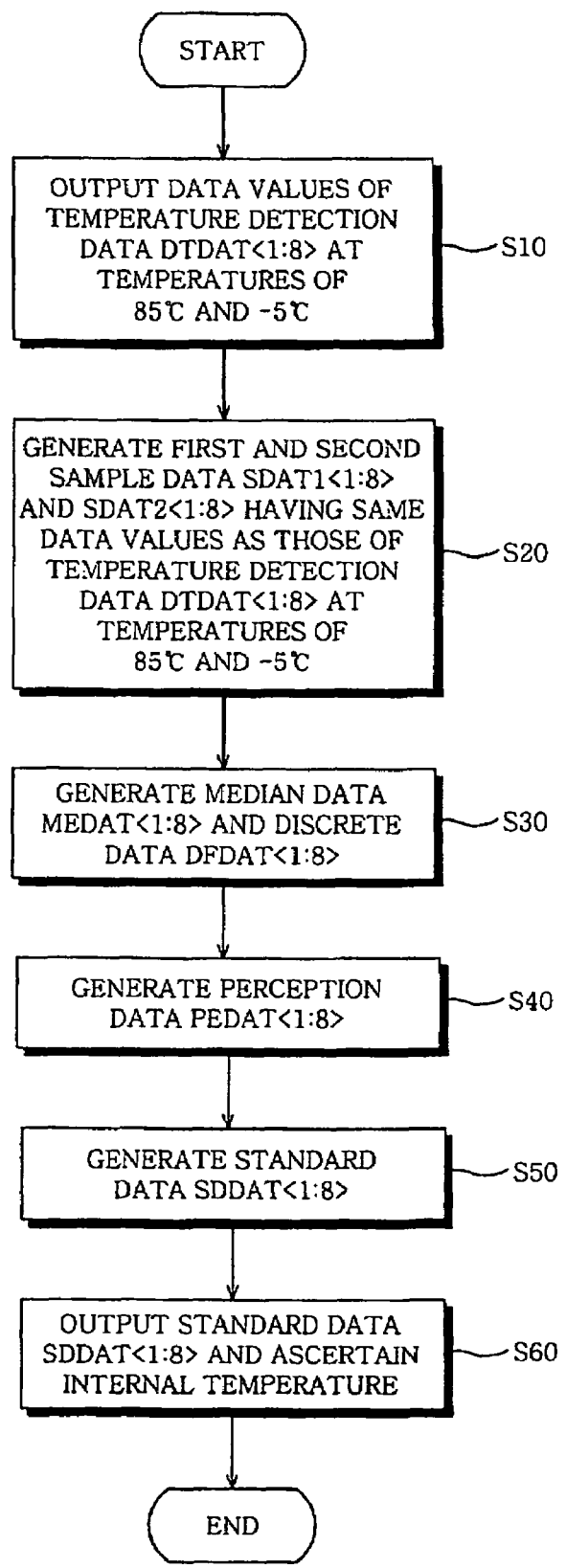

FIG. 13 is a flowchart illustrating a method of detecting the internal temperature of a semiconductor using a digital temperature detection circuit according to an embodiment of the present invention. In the description that follows, exemplary method steps are denoted by parentheses (XXX). Referring to FIG. 13, internal temperature ITEMP is set to 85° C. and then to −5° C., and respective data values of detection data DTDAT<1:8> corresponding to these temperatures are output (S10).

Next, fuses in first and second fuse sets FU1 and FU2 (refer to FIG. 1) are selectively cut so that first and second sample data SDAT1<1:8> and SADT2<1:8> are generated with the same data values as detection data DTDAT<1:8> when internal temperature ITEMP is 85° C. and −5° C., respectively (S20).

Next, median data MEDAT<1:8> and discrete data DFDAT<1:8> are generated using the sum of first and second sample data SDAT1<1:8> and SADT2<1:8> and the difference between the first and second sample data SDAT1<1:8> and SADT2<1:8> (S30). Then, perception data PEDAT<1:8> is generated using both median data MEDAT<1:8> and discrete data DFDAT<1:8> (S40).

Next, the data value of perception data PEDAT<1:8> is displaced to generate standard data SDDAT<1:8> (S50). Then, standard data SDDAT<1:8> is output, and internal temperature ITEMP is ascertained as the output standard data SDDAT<1:8> (S60).

As described above, a digital temperature detection circuit for a semiconductor device comprises a digital temperature detection block for generating detection data corresponding to internal temperature, and a data conversion block for converting the detection data into standard data and outputting the standard data. The data value of the standard data varies by "1" when the internal temperature varies by 1° C. Accordingly, a user can easily ascertain internal temperature by reading the standard data.

Further, in a digital temperature detection circuit according to various embodiments of the invention, when detection data is converted into perception data or standard data, first and second sample data each have the same data value as the detection data for some known value of the internal temperature. Thus, the digital temperature detection circuit is capable of adjusting its output value using the first and second sample data as reference temperatures to improve the accuracy and response interval of the output value.

The foregoing preferred embodiments are teaching examples. Those of ordinary skill in the art will understand that various changes in form and details may be made to the exemplary embodiments without departing from the scope of the present invention as defined by the following claims.

What is claimed is:

1. A digital temperature detection circuit for a semiconductor device, comprising:
    a digital temperature detection block adapted to detect an internal temperature of the semiconductor device and generate detection data having a data value that varies in accordance with the detected internal temperature; and,
    a data conversion block adapted to convert the detection data into standard data with a predetermined response interval using first and second sample data having respective data values that are determined by input from an external source.

2. The digital temperature detection circuit of claim 1, wherein the digital temperature detection block comprises:
    a temperature detector adapted to generate a temperature detection signal with a voltage level that varies monotonically in relation to the internal temperature of the semiconductor device; and,
    an analog-to-digital converter adapted to convert the voltage level of the temperature detection signal into the detection data.

3. The digital temperature detection circuit of claim 2, wherein the analog-to-digital converter uses Successive Approximation Register (SAR) conversion.

4. The digital temperature detection circuit of claim 1, wherein the data conversion block comprises:
    a data converter adapted to convert the detection data into the standard data; and,
    a multiplexer adapted to selectively output the detection data or the standard data based on a multiplexer control signal.

5. The digital temperature detection circuit of claim 1, wherein the data converter comprises:
    an operation unit adapted to generate median data and discrete data using the first and second sample data, wherein the median data has a data value that is the median of the first and second sample data, and the discrete data has a data value that corresponds to a specific range of variation in the detection data;
a data generation unit adapted to generate reference data and perception data, wherein the reference data has a data value calculated by interpolation using the median data and the discrete data, wherein the perception data has a data value with the same response interval as the standard data, and wherein the data generation unit outputs the reference data and the perception data in response to a data comparison signal; and,
a comparison unit adapted to compare the reference data with the detection data and output the data comparison signal to the data generation unit with a logic state determined by a result of the comparison.

6. The digital temperature detection circuit of claim 5, wherein the data generation unit comprises:
a reference data generation means adapted to output the reference data in response to the data comparison signal; and,
a perception register adapted to store the perception data.

7. The digital temperature detection circuit of claim 5, wherein the operation unit comprises:
a median data generation block adapted to generate the median data using a sum of the data values of the first and second sample data; and,
a discrete data generation block adapted to generate the discrete data using a difference between data values of the first and second sample data.

8. The digital temperature detection circuit of claim 7, wherein the median data generation block comprises:
a summing unit adapted to generate sum data by summing the data values of the first and second sample data; and,
a shifting unit adapted to right-shift the sum data by one bit.

9. The digital temperature detection circuit of claim 7, wherein the discrete data generation block comprises:
a subtraction unit adapted to calculate a difference between the data values of the first and second sample data to generate subtraction data;
a multi-shifting unit adapted to sequentially right-shift the subtraction data in response to a control clock signal to generate discrete shift data; and,
an accumulation unit adapted to accumulate data values of the discrete shift data in response to an accumulation control signal to generate the discrete data.

10. The digital temperature detection circuit of claim 5, wherein the data converter further comprises a data value displacement unit adapted to displace the data value of the perception data by a predetermined displacement value to generate the data value of the standard data.

11. The digital temperature detection circuit of claim 10, wherein the data converter further comprises a displacement value fuse set for controlling the displacement value.

12. The digital temperature detection circuit of claim 4, further comprising a master fuse block that can be externally cut to determine the logic state of the multiplexer control signal.

13. The digital temperature detection circuit of claim 1, further comprising a sample data generation block adapted to generate the first and second sample data.

14. The digital temperature detection circuit of claim 13, wherein the sample data generation block comprises first and second fuse sets, each including fuses that can be externally cut to determine the data values of the first and second sample data.

15. A digital temperature detection circuit for a semiconductor device, comprising:
a temperature detector adapted to generate a temperature detection signal with a voltage level that varies monotonically in relation to an internal temperature of the semiconductor device;
an analog-to-digital converter adapted to convert the voltage level of the temperature detection signal into detection data having a data value corresponding to the voltage level; and,
a data converter adapted to convert the detection data into standard data having a predetermined response interval using first and second sample data, which have data values that are determined by input from an external source.

16. The digital temperature detection circuit of claim 15, further comprising a multiplexer adapted to selectively output the detection data or the standard data based on a logic state of a predetermined multiplexer control signal.

17. The digital temperature detection circuit of claim 15, wherein the analog-to-digital converter uses Successive Approximation Register (SAR) conversion.

18. The digital temperature detection circuit of claim 15, wherein the data converter comprises:
an operation unit adapted to generate median data and discrete data using the first and second sample data, wherein the median data has a data value that is the median of the first and second sample data, and the discrete data has a data value that corresponds to a specific range of variation in the detection data;
a data generation unit adapted to generate reference data and perception data, wherein the reference data has a data value calculated by interpolation using the median data and the discrete data, wherein the perception data has a data value with the same response interval as the standard data, and wherein the data generation unit outputs the reference data and the perception data in response to a data comparison signal; and,
a comparison unit adapted to compare the reference data with the detection data and output the data comparison signal to the data generation unit with a logic state determined by a result of the comparison.

19. The digital temperature detection circuit of claim 18, wherein the data generation unit comprises:
a reference data generation means adapted to output the reference data in response to the data comparison signal; and,
a perception register adapted to store the perception data.

20. The digital temperature detection circuit of claim 18, wherein the operation unit comprises:
a median data generation block adapted to generate the median data using a sum of the data values of the first and second sample data; and,
a discrete data generation block adapted to generate the discrete data using a difference between data values of the first and second sample data.

21. The digital temperature detection circuit of claim 20, wherein the median data generation block comprises:
a summing unit adapted to generate sum data by summing the data values of the first and second sample data; and,
a shifting unit adapted to right-shift the sum data by one bit.

22. The digital temperature detection circuit of claim 20, wherein the discrete data generation block comprises:
a subtraction unit adapted to calculate a difference between the data values of the first and second sample data to generate subtraction data;
a multi-shifting unit adapted to sequentially right-shift the subtraction data in response to a control clock signal to generate discrete shift data; and, an accumulation unit adapted to accumulate data values of the discrete shift data in response to an accumulation control signal to generate the discrete data.

23. The digital temperature detection circuit of claim 15, wherein the data converter further comprises a data value displacement unit adapted to displace the data value of the perception data by a predetermined displacement value to generate the data value of the standard data.

24. The digital temperature detection circuit of claim 23, wherein the data converter further comprises a displacement value fuse set for controlling the displacement value.

25. The digital temperature detection circuit according to claim 15, further comprising a sample data generation block adapted to generate the first and second sample data.

26. The digital temperature detection circuit according to claim 25, wherein the sample data generation block comprises first and second fuse sets, each including fuses that can be externally cut to determine the data values of the first and second sample data.

* * * * *